Oct. 18, 1966

H. W. K. ENCHELMAIER 3,279,857

APPARATUS FOR MAKING BRUSHES

Filed Dec. 11, 1964

INVENTOR.
HARVARD W. K. ENCHELMAIER

BY
Alfred W. Vissor

ATTORNEY

Oct. 18, 1966  H. W. K. ENCHELMAIER  3,279,857
APPARATUS FOR MAKING BRUSHES
Filed Dec. 11, 1964  5 Sheets-Sheet 2
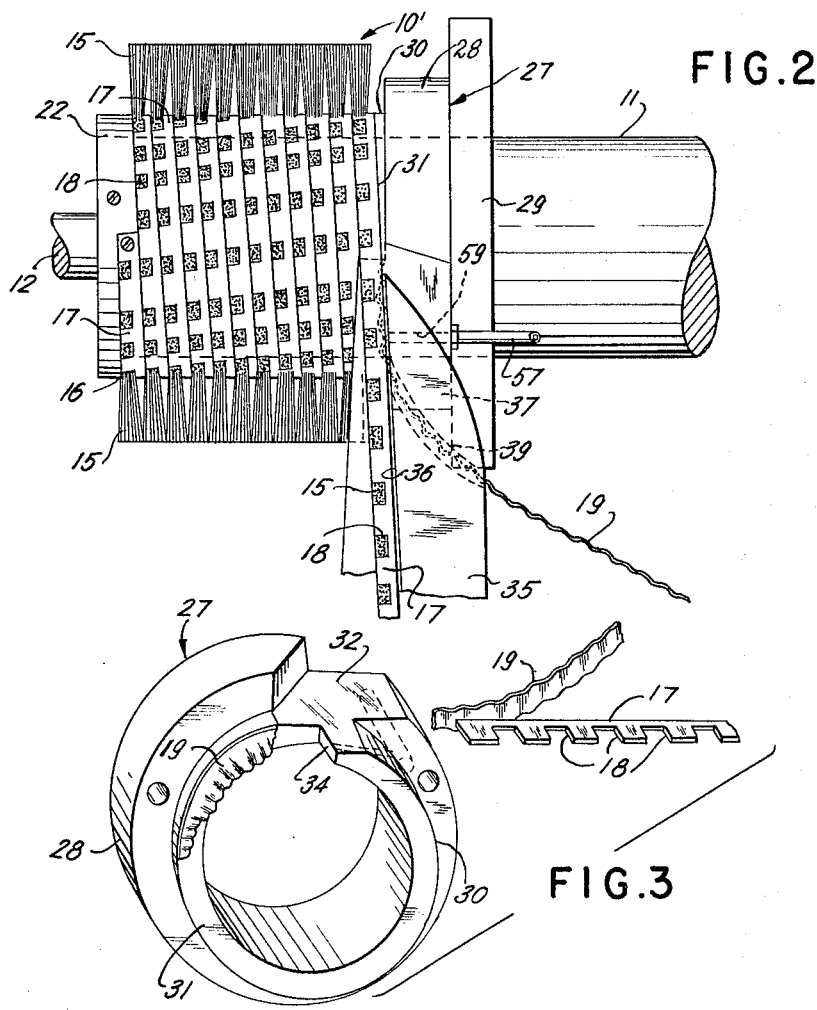
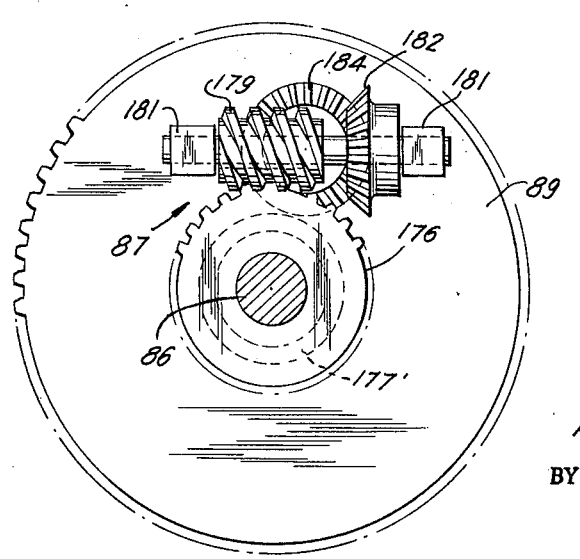
INVENTOR.
HARVARD W. K. ENCHELMAIER
BY Alfred W. Nibber
ATTORNEY

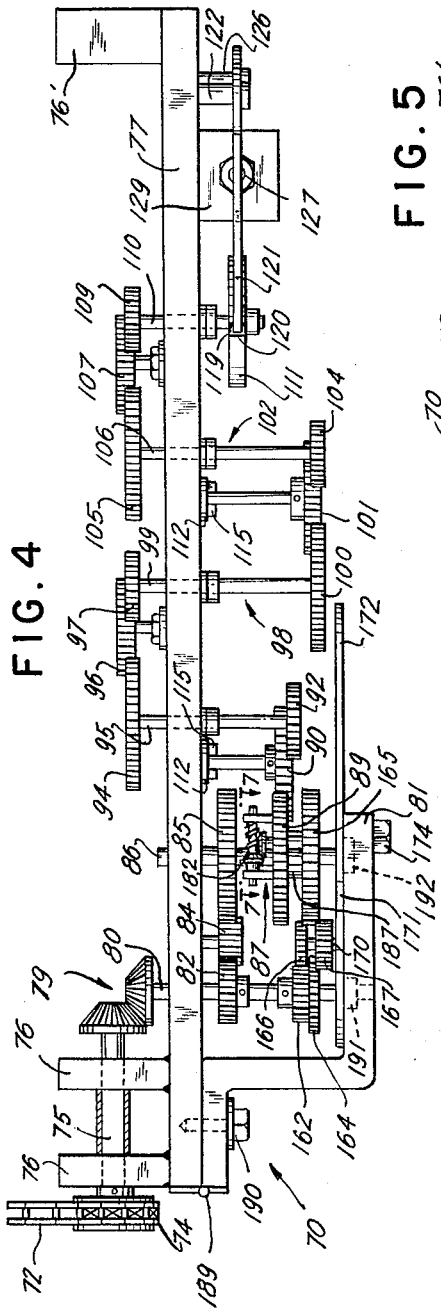

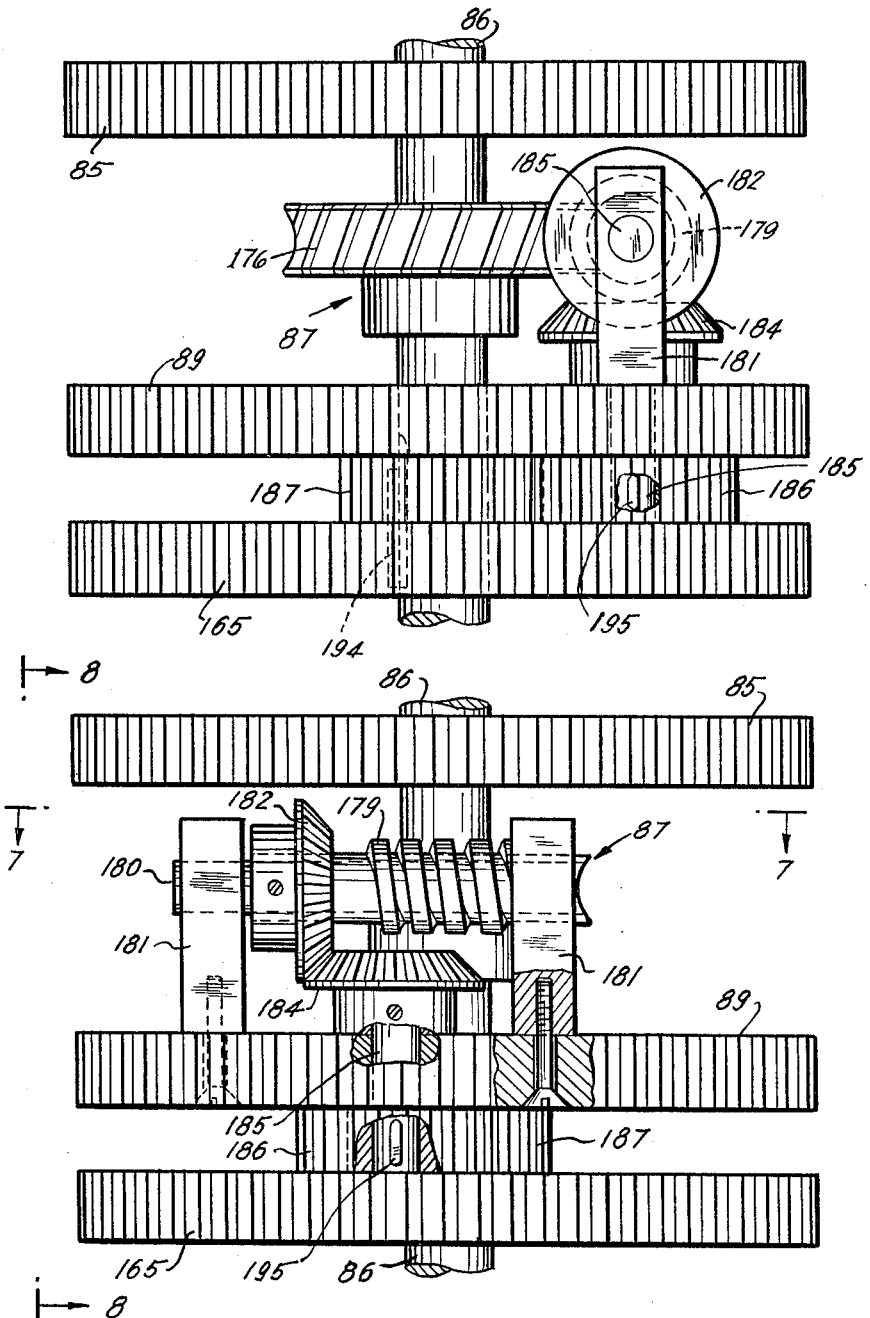

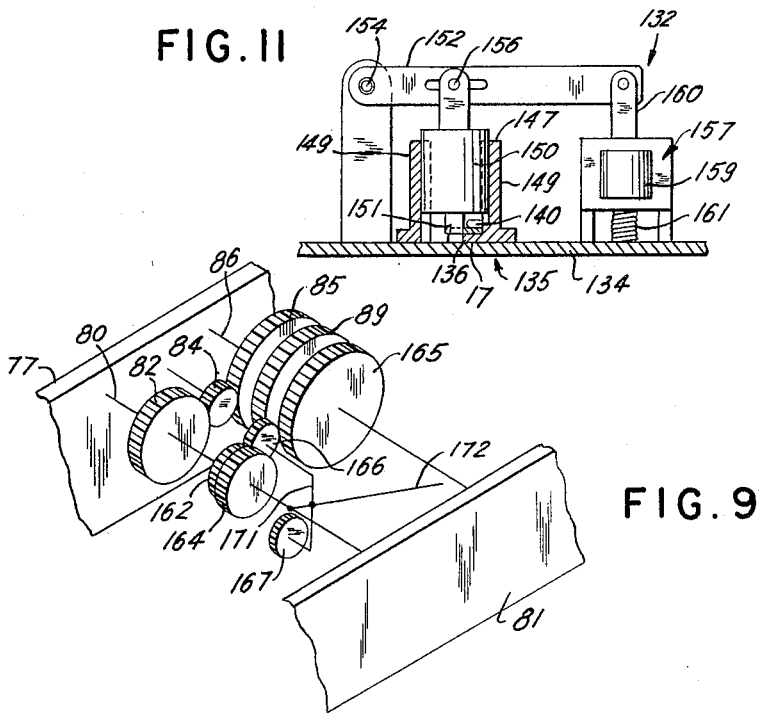
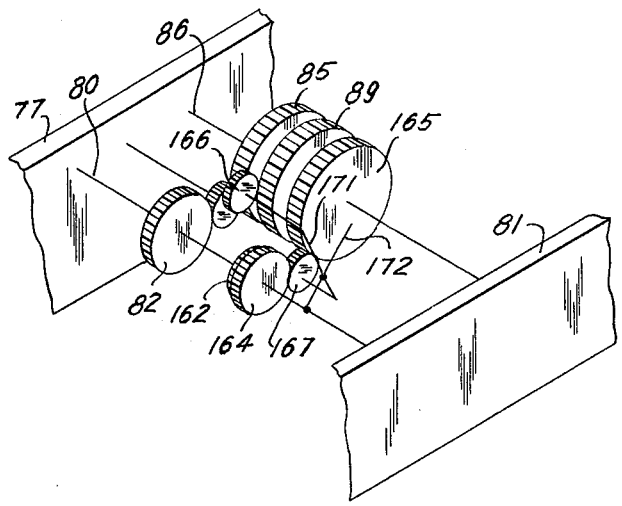
FIG. 11
FIG. 9
FIG. 10

3,279,857
APPARATUS FOR MAKING BRUSHES
Harvard W. K. Enchelmaier, 24 Kingwood Drive, Great Notch, N.J.
Filed Dec. 11, 1964, Ser. No. 417,705
18 Claims. (Cl. 300—4)

This invention relates to apparatus for forming cored cylindrical brushes. More particularly, the invention relates to a machine for forming cored cylindrical brushes wherein tufts of bristles are located and at least partially retained on the core in a predetermined desired spaced relationship by a notched strip or wire helically wound on the brush core.

This invention constitutes an improvement upon that disclosed and claimed in Enchelmaier et al. Patent No. 2,797,966. In such prior invention the brush core is mounted in and driven by a lathe-like apparatus so as to rotate about its axis. As the core is driven, two strips or wires are helically wound thereon, a first such wire being laid edgewise upon the core and a second such wire, which is notched on one edge, being helically wound upon the core with its broad extent parallel to the core, such second wire lying upon the outer edge of the first wire. Bristles are fed to the notched edge of the second wire being wound upon the brush core so as to form generally radially extending bristle tufts. The space provided between the wires and about the roots of the bristle tufts is progressively filled with a curable adhesive, such adhesive being cured, after the brush has been fully wound, so as strongly to bond the wires and the roots of the bristle tufts to the brush core.

The spacing between successive notches in the edge of the second wire determines not only the distance between successive rows of tufts on the brush but the overall arrangement of the bristle tufts on the brush, that is, whether the rows lie straight and parallel to the longitudinal axis of the brush core, lie in staggered rows parallel to the brush axis, or lie in helically disposed spiral rows. In the apparatus of the said Enchelmaier et al. Patent No. 2,797,966, the notches on the second wire are formed by a punch press disposed along the path of the second wire as it is fed to the brush core, such punch press being driven from the main shaft of the apparatus, by which the brush core is driven, at a speed determined by an infinitely variable speed-changing device. Although such apparatus works well, it has been found that because of inherent limitations in the speed-changing device a desired nicety of control of the spacing of such notches in the second wire produce brushes having desired bristle row configurations cannot be attained without constant operator attention.

Not only that, but when a brush having a new bristle tuft spacing and/or configuration is to be produced, it is necessary that at least a part of a trial brush be initially produced in order to set the desired speed changer properly. A slight change in the ratio of the speed of rotation of the brush core to the speed at which the punch press is driven produces an appreciable, readily noticeable, change in the disposition of the rows of bristle tufts upon the core. Because the speed changer employed in the prior apparatus is inexact, an operator must be present in order constantly to watch the brush being formed and to correct the machine whenever he observes a deviation in the manner of laying down the bristle tufts from the desired pattern. Thus the prior machine requires first, that there be a deviation from the ideal in the brush being formed, and then that such deviation be corrected. Whereas such deviations are not readily noticeable in brushes wherein the rows of tufts lie on a spiral, they can readily be seen in a brush wherein the bristle tufts lie parallel to the axis of the brush.

The brush-making apparatus of the present invention overcomes the above-outlined difficulties as to control of the configuration of rows of bristle tufts in brushes of the described type. The apparatus of the present invention provides novel mechanism for drivingly connecting the means mounting and operating the brush arbor with the means for notching the edge of the said second wire, whereby the spacing between successive notches on such wire bears a definite predetermined desired relationship to the angular speed of the brush core. As a result, the apparatus may be set up in advance by simple mathematical computation to produce a brush having bristle tufts disposed in the desired configuration, thereby dispensing with the necessity of making one or more trial brushes. In addition, such apparatus permits brushes of different configurations readily to be produced simply by the substitution of one or more gears in the driving train between the arbor rotating means and the means for driving and/or timing the wire notching means. In the illustrative preferred embodiment of apparatus in accordance with the present invention, the described connector means includes a novel differential gearing mechanism whereby brushes having bristle tufts disposed in rows of shallow helix angles may be accurately formed, a result which was hitherto unobtainable.

The invention has among its objects the provision of a novel machine for forming cored cylindrical brushes wherein the bristle tufts are retained by one or more wires wound helically upon the brush core.

A further object of the invention is the provision of a brush-forming apparatus of the type indicated employing an edge notched bristle retaining wire, wherein the ratio between the speed of rotation of the brush core and the spacing between successive notches in the wire may be accurately predetermined and maintained during the winding of a brush, free from operator attention.

Another object of the invention is the provision of an apparatus for forming wire bound brushes of the type indicated incorporating a novel driving and/or timing connecting means between the arbor driving mechanism and the edge notching punch driving means which permits the facile changing of such driving mechanism to produce brushes with different spacings between adjacent rows of tufts.

Still another object of the invention is the provision of a novel brush-making apparatus which may be readily controlled so as selectively to produce brushes with straight rows of bristle tufts or spiral rows of bristle tufts.

Yet another object of the invention resides in the provision of a novel gearing mechanism whereby minute changes in angular speed between that of the driving and driven shafts thereof may be attained, and further, wherein such differences in speed may be readily changed by simple alterations in the mechanism.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in plan of a preferred embodiment of the brush-forming machine of the invention;

FIG. 2 is an enlarged fragmentary view in plan of a partially formed brush and of the sleeve or bushing portion of the machine for applying to the brush core the second, notched strand, the first, crimped strand, and the bristle tufts engaged in the notches of the first strand, the rows of bristles of the partially formed brush facing the reader being removed except for the roots thereof;

FIG. 3 is a fragmentary schematic view of the sleeve or bushing of the machine and of the two bristle retaining strips or strands approaching it;

FIG. 4 is an enlarged view in plan of the mechanism, here termed the spacing mechanism, which correlates the speed of driving of the brush core with the spacing between successive notches in the edge of the notched strand, the spacing mechanism being shown with its parts in position to form straight row brushes or straight row staggered brushes;

FIG. 5 is a view in front elevation of such spacing mechanism with its parts in the same positions as in FIG. 4, the view being taken in an upwardly direction in FIG. 4;

FIG. 6 is an enlarged view in plan of the differential driving mechanism forming a part of the spacing mechanism and employed in the forming of brushes having helically disposed bristle rows;

FIG. 7 is a view in vertical section through the differential driving mechanism, the section being taken along the line 7—7 in FIGS. 4 and 6, the figure showing the mechanism as viewed from such line in the direction of the arrows;

FIG. 8 is a view in end elevation of the differential driving mechanism, the view being taken from the line 8—8 in FIG. 6;

FIG. 9 is a schematic view in perspective of a portion of the spacing mechanism at the shiftable gearing of such mechanism, the gear shifting plate and lever being shown in their lower positions as during the forming of one embodiment of spiral row brush;

Figure 1:
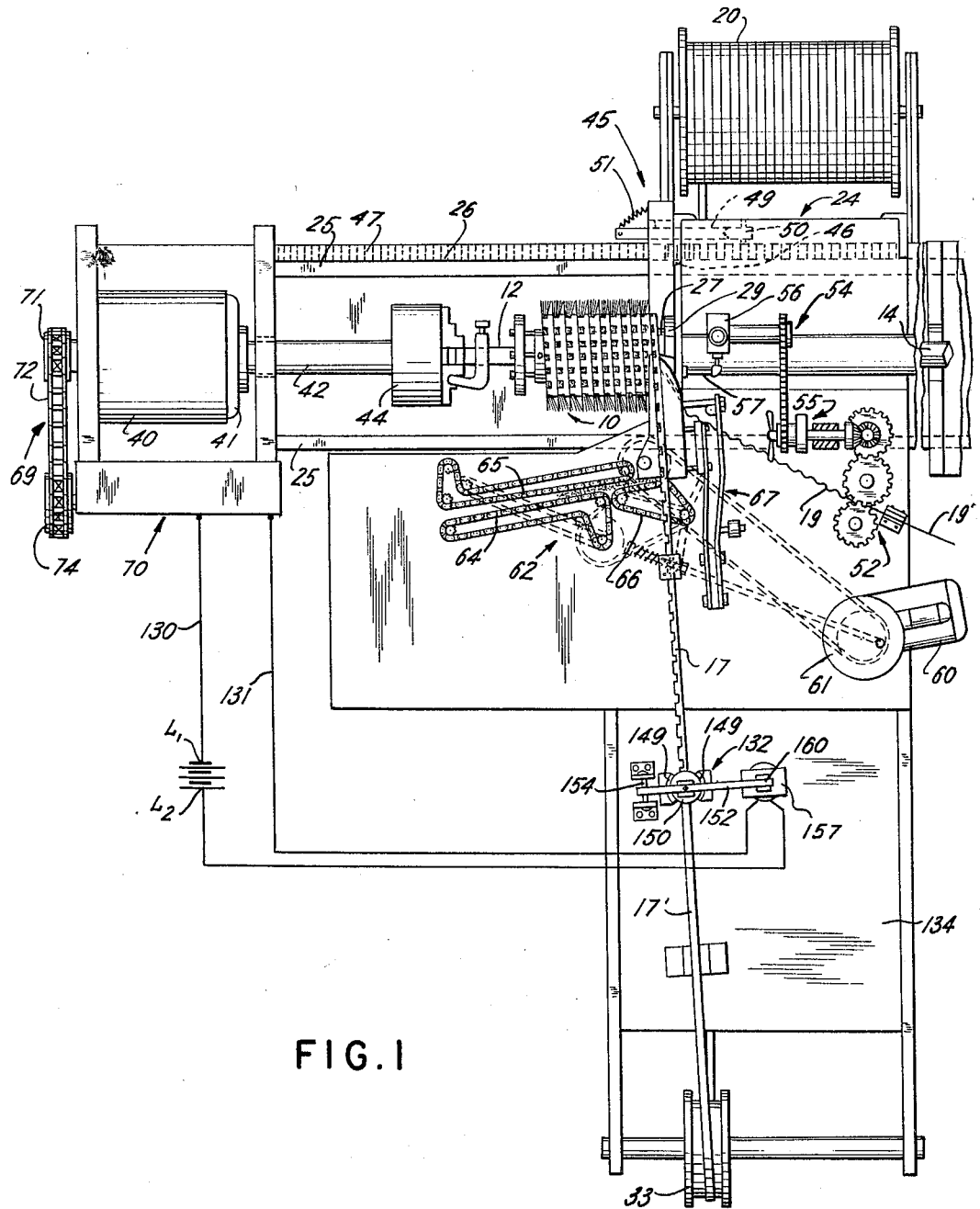

FIG. 10 is a schematic view in perspective of a portion of the spacing mechanism similar to FIG. 9, but with the gear shifting plate and lever shown in their upper positions as during the forming of another embodiment of spiral row brush having a different bristle tuft row helix angle from that produced by the apparatus when the spacing mechanism is in the condition shown in FIG. 9; and FIG. 11 is an enlarged view partially in end elevation and partially in vertical section of the punch press employed in the brush-forming apparatus of the present invention.

The construction of a typical brush made by the apparatus of the invention will be apparent from a consideration of a portion of the brush being formed by the machine in FIGS. 1 and 2, and designated generally by the character 10. Such brush has a circular cylindrical core 11 having a reduced diameter left-hand end 12 and a similar reduced diameter right-hand end 14. In such brush a plurality of bristle tufts 15 are arranged in a plurality of parallel, equally spaced rows arranged helically on the core. In the drawings, for the sake of simplicity, such rows are depicted as straight lines. The bristle tufts 15 have roots 16 (FIG. 2) which abut the outer surface of the core and which were initially located on the brush core by reason of the reception of each in its particular notch 18 in the left-hand edge (FIGS. 1 and 2) of the first flat strand 17. The strand 17, the broad surface of which lies parallel to the outer surface of the core 11, overlies the radially extending edge-wound strand 19 on the core. The strand 17, adjacent turns of strand 19, and the outer surface of the core 11 of the brush form a laterally and radially outwardly closed space into which is flowed bristle-retaining adhesive under pressure so as to bond the bristle tufts to the core and to each other. The left-hand end of the brush core, at which the bristle assembly is started, is provided with a collar 22 held thereon by the set screw, and the brush confronting face of the collar being of helical configuration and having a clamping means at the step thereof, as shown in FIG. 2, whereby the leading ends of the strands 17 and 19 may be secured to the collar. A similar collar (not shown) is employed at the end of the brush core last to be wound (the right-hand end in FIG. 1) whereby to retain the trailing ends of the strands 17 and 19. The unnotched outer strip, designated 17', is supplied, as in the above Enchelmaier et al. patent, from the reel 20 mounted on the rear of the carriage of the machine, strip 17' being led under the carriage over the idle guiding pulley 33 supported on the forward edge of the carriage and thence to the punch press 132, to be described. The inner, upstanding strip 19 is supplied in a straight condition, in which it is designated 19', as from a reel (not shown) disposed on a support affixed to the frame of the apparatus at the right-hand end thereof. Strip 19' travels from its supply reel to crimping rollers of a mechanism 52 and thence to a guide means 37 having a rounded surface leading to the point of application of the strip 19 to the brush core. In these respects the apparatus is similar to that of the above Enchelmaier et al. patent.

The brush-making apparatus is provided with a carriage 24 which moves longitudinally along the front and rear ways or guide members 25 and 26, respectively, of the bed of the apparatus. Fixedly mounted upon the rear or trailing edge of the carriage is a means for applying the bristles and strands to the brush core. Such means is in the form of a bushing 27 fixedly supported upon the carriage 24 and surrounding the brush core 11 in concentric relationship therewith. Bushing 27 is supported on the rear face of a plate-like member 29 affixed to the carriage, as shown in FIGS. 1 and 2.

Bushing 27 has a forward, larger diametered portion 28 of generally circular cylindrical configuration and a rearwardly facing portion 30 of smaller diameter and having a helical face 31 which starts with a minimum height or longitudinal extent at the top of the bushing 27 and which increases in height in a counterclockwise direction (FIG. 3) until it reaches its maximum height somewhat in front of the upper portion of the bushing. Such upper portion of the bushing, both in its larger and smaller diametered parts, is provided with a flat surface 32 extending horizontally to intersect the smaller diametered part of the bushing somewhat to the rear of the top thereof. The unnotched strip 17', as above noted, is guided over the idle pulley 33 and then, after being notched by punch press 132, travels rearwardly (now designated 17) over the carriage so as to contact the upper entering end of the helical surface 31 of the bushing 27, as shown in FIGS. 2 and 3. The first wire or strip 19' is fed from the supply reel therefor to crimping means 52 therefor and is conducted in crimped condition in a path which lies tangential to the entering end of helical surface 31, also as shown in FIGS. 2 and 3. As the brush core rotates, winding the strips of wire 17 and 19 thereon, the strips laid down upon the brush core progressively travel up the helical surface 31, with strip 17 overlying the wire 19, the unnotched edge of strip 17 engaging the outer edge of helical surface 31. As shown, the smaller diametered portion 30 of the bushing 27 has a longitudinally and radially extending shoulder 34 at the exit end of the helical surface 31, such shoulder lying parallel to the axis of the brush core and having a longitudinal dimension (width) equal to the width of the wire 17.

During the travel of the strip 17 to the bushing 27, its forward, unnotched edge contacts and is guided by the rear straight edge 36 of a fixed guide member 35, as shown in FIG. 2. The crimped or corrugated strip 19 is fed from the corrugating means 52 to the rounded guide surface 39 of a fixed guide member 37 which is disposed below guide member 35, as shown in FIG. 2. The above described elements are substantially the same as those disclosed and claimed in the above Enchelmaier et al. patent, to which reference is made for further details of the construction and mode of operation of such parts of the apparatus.

The brush-making apparatus is driven by an electric motor 40 through a suitable speed-reducing gear means 41 which drives the main arbor shaft 42 of the apparatus. A chuck 44 mounted on the forward end of arbor 42 mounts the end portion 12 of the brush and rotates it through a suitable dog. The described progressive winding of the strips 17 and 19 upon the brush core, in which successive turns of the strip 17 are in edge engagement, causes the carriage 24 of the apparatus to be progressively thrust to the right (FIG. 1). To insure the desired tight edge engagement of successive turns of strip 17, the carriage 24 is suitably retarded from such movement by a brake mechanism generally designated 45. Such brake mechanism includes a pinion 46 journalled on the carriage 24 and meshing with a rack gear 47 affixed to the fixed bed of the apparatus. Fixedly mounted on the shaft carrying pinion 46 is a brake drum 49 which is engaged by a flexible brake member 50 suitably tensioned against the brake drum by a coil tension spring 51.

As in the above Enchelmaier et al. patent, the apparatus is provided with an adhesive pumping mechanism which is driven by the crimping or corrugating rolls of the crimping means 52 which operate upon the strip 19'. Such driving mechanism, which is generally designated 54, includes a clutch 55 whereby the pump may be disengaged from its drive and driven manually if desired. The thus driven adhesive pump 56 delivers adhesive under pressure to the apparatus slightly in advance of the bushing 27 through a delivery pipe 57 from the pump and an adhesive conducting passage 59 in the supporting member 29 for the bushing 27.

Bristles are fed to the notched edge of the strip 17 in the same manner as in the Enchelmaier et al. patent. Briefly, such bristle feeding means includes a separate motor 60 having a speed reducing gearing portion 61 from which the bristle feeding mechanism, generally designated 62, is driven. The bristle feeding mechanism includes two chains 64 and 65 disposed with generally parallel operative runs between which bristles are fed in upright position. A third chain 66 having an operative run which slightly overlaps that of chain 65 forwards the bristles to the notched edge of strip 17. The driving train from the speed reducer 61 of motor 60 to the bristle feeding means is generally designated 67. Again, reference is had to the Enchelmaier et al. patent for further details of the construction and mode of operation of the bristle feeding means.

In accordance with the invention, the means forming spaced notches in the rear edge of strip 17' is under the control of a novel mechanism generally designated 70 which is here termed a "spacing mechanism." Such spacing mechanism is mounted upon the fixed frame structure of the apparatus, as shown, and is driven by the motor 40 of the apparatus through a drive train 69 at a speed which is positively synchronized with that of arbor 42. The driving train 69 includes a sprocket 71 fixed to arbor 42, a sprocket 74 fixed to the main input shaft 75 of the spacing mechanism 70, and a chain 72 entrained over the sprockets. The construction and manner of operation of the spacing mechanism 70 will be more readily understood by reference to FIGS. 4–8, inclusive.

As shown in FIGS. 4 and 5, the mechanism 70 has a main frame generally in the form of a plate 77 which is affixed to the bed or frame of the apparatus by suitable pedestal mounting means 76, 76', as shown. The shaft 75 extends through and is journalled in the two pedestals 76 at the left in FIG. 4. The forward end of shaft 75 is connected to a transverse drive shaft 80 by a mitre gear set 79. For simplicity, gear set 79 is shown as having a 1:1 ratio; it is understood, however, that miter gears having other suitable driving ratios may be employed. Drive shaft 80, as well as a further parallel shaft 86, to be described, are journalled at their rear ends in the plate 77 and at their forward ends 191 and 192, respectively, in bearings supported in a forward sub-frame member 81. As will appear, frame portion 81 and the bearings carried thereby are preferably mounted so that the forward ends of shafts 80 and 86 are readily freed from the bearings so as to permit the quick removal of gears from such shafts and the replacement of them by other gears as required by brushes to be made which have bristle row configurations and spacings different from those of brush 10.

Affixed to shaft 80 so as to be driven thereby is a first gear 82. Gear 82 is in constant mesh with a first intermediate gear 84 which, in turn, meshes with and drives a gear 85 affixed to the shaft 86. Also mounted upon the shaft 86 but rotatable with respect thereto are further gears 89 and 165; gears 85, 89, and 165 in the embodiment shown have substantially the same diameters. As will appear hereinafter, the shaft 86, and thus gear 89, is driven by gear 82, acting through the intermediate gear 84, which as noted remains always in mesh with gears 82 and 85, when straight row brushes are being made. The gear set 85, 89, 165 is provided with an irreversible worm gear assembly 87 functioning as a differential mechanism. For the moment it will suffice to say that when gear 85 is driven but gear 165 is not driven, gear 89 derives its drive through the irreversible gearing 87, the speeds of gears 85 and 89 then, in this case, having a 1:1 ratio. Such manner of driving of the gears 85, 89 is employed when the brush-forming mechanism is engaged in making either a straight row or a staggered row brush in which the rows of brushes lie parallel to the axis of the brush core.

Assuming that a brush with straight bristle rows is being made, the parts of the spacing mechanism are in the position shown in FIGS. 4 and 5, and the drive from shaft 75 proceeds through the mitre gear set 79, shaft 80, gear 82, and gear 84 to gear 85. The irreversible worm assembly 87 transmits the drive at the same speed from gear 85 to the gear 89 which, in turn, is in mesh with an intermediate gear 90, and thence through a pinion set 91 and a further intermediate gear 96, another pinion set 98, a further intermediate gear 101, a third pinion set 102, and a timing or contact wheel 111 which is driven by pinion set 102 through a further intermediate gear 107. Each of such pinion sets has a small and a large pinion which are integrally connected to each other, pinion set 91 being mounted on a shaft 95 and having a small pinion 92 and a large pinion 94, pinion set 98 being mounted on a shaft 99 and having a small pinion 97 and a large pinion 100, and pinion set 102 being mounted on a shaft 106 and having a small pinion 104 and a large pinion 105.

With each of the serially disposed pinion sets and intermediate gears the drive is in such direction as to multiply the speed, that is, the small pinions are driven and the large pinions drive the smaller gear of each next succeeding gear set. Thus the timing or contact wheel 111, which is affixed to a shaft 110 and driven by a pinion on the shaft meshing with idle gear 107, rotates many times during one rotation of the brush arbor or core. The ratio of the speed of rotation of the wheel 111 to that of the brush arbor may be readily changed by the substitution of different pinion sets for one or more of sets 91, 98, and 102, such substituted pinion sets having different ratios of the diameters of the small to the large pinions thereof. Thus the ratio of speed of rotation of wheel 111 to that of the brush arbor may be readily determined mathematically, and when thus determined and secured by the use of appropriate gears, remains fixed.

To permit such substitution of different pinion sets, each of the intermediate gears 90, 96, 101, and 107 is mounted on a bracket 112 which is mounted upon frame plate 77 for adjustment vertically and angularly with respect to the frame so that the intermediate gear meshes with the two gears which it spans. Bracket 112 is shown as being provided with a vertically extending slot 114 through which there extends a machine screw 115 which is threaded into the frame plate 77. Thus during a change of gearing, as above described, one or more of the intermediate gears may be lowered or raised as the case may be to remove it sufficiently from the gear train to permit such substitution of pinion gear sets. The intermediate gear or gears are then advanced into meshing engagement with the gears which they bridge, following which the screws 115 of their brackets are tightened.

The contact wheel 111 is shown as being in the form of a disc, which may be made of electrically insulating material, and which has a circular cylindrical outer surface with the exception of one zone thereof which is provided with a radially inwardly extending shoulder 119 and a ramp 120 extending from the root of the shoulder, the shoulder and root cooperating with a contact follower 124 whereby a movable contact 117 is removed from engagement with a generally fixed contact 116 except when the cam follower travels inwardly of the shoulder on the contact wheel 111. The contact follower 124 is disposed at the end of an arm 121 which is mounted upon an electrically insulating pivot pin 122, the movable contact 117 being mounted intermediate the length of such arm. To permit a desirable adjustment of the generally fixed contact 116, such contact is mounted on the outer free end of a lower arm 125 which is pivotally mounted upon an electrically insulating pivot pin 126. An adjustable abutment screw 127 disposed beneath arm 125 is screwed into a threaded fixed support 129 secured to frame plate 77 and insulated therefrom. Wires 130 and 131 lead from the arms 121 and 125, respectively, to a solenoid operated punch generally designated 132 which notches the edge of the strip 17'. A suitable source of power for the solenoid is connected to terminals $L_1$ and $L_2$ in one of the wires 130, 131. The device is arranged so that on each passage of the shoulder and ramp 119, 120 of contact wheel 111 past the contact follower 124 the solenoid of the punch 132 is energized, thereby to drive the notching punch of the press downwardly to form a notch on the edge of the strip 17'.

The structure of the punch press is shown more particularly in FIGS. 1 and 11. Such press, which is mounted upon a front extension 134 of the carriage 24, includes a stationary anvil generally designated 135, the anvil being made up of a stationary die block 136 having a central vertical notch therein to receive the cutting punch 151 as it reciprocates with respect thereto. A top plate 140 forms with the upper edge of the die block a guiding groove accurately receiving the right-hand edge of the strand 17'. Bolts (not shown) extending through the top plate and the die block retain them in position on the front carriage extension 134. The strand 17' may be accurately held in such guide in anvil 135 by the two channel pressure pads (not shown) positioned one on each side of the punch 151. The structure of the anvil, die block, and strip guiding and retaining means may be the same as such parts as shown in FIG. 3 of Enchelmaier et al. Patent No. 2,797,966.

The punch press includes an upstanding press frame having opposed vertical guideways 149 therein. Mounted in guideways 149 is a vertically reciprocable slide 150 upon the lower end of which the above-mentioned punch 151 is mounted in a suitable holder. In order to secure a multiplication of the force exerted by the solenoid of the press upon slide 150, the slide is connected to a second-class operating lever 152, one end of which is pivotally connected to the fixed structure of the press by a pivot means 154. Intermediate the length of the lever 152 there is provided a pivotal connection 156 between it and the upper end of the slide 150. The press is provided with a solenoid 157 having a coil 159 and a plunger 160 reciprocable therein. Energization of the solenoid pulls the plunger downwardly and thus imparts a strip-notching stroke to the slide 150 and the punch 151. The solenoid plunger, the operating lever, and the slide of the punch are constantly urged upwardly, so that they are elevated when the solenoid is de-energized, by a coil compression spring 161 which is disposed between the lower end of the solenoid plunger and a lower fixed portion of the press frame.

When the ratio of the speeds of rotation of the brush arbor and the contact wheel 111 is a small whole number of which 20 may be an example, successive bristles in each bristle row disposed longitudinally of the brush are in exact alignment. As a result, the brush then formed is a straight row brush. If, however, on the same basis the ratio between the speed of rotation of the brush arbor and that of the contact wheel 111 should be 19½, a staggered row brush would result. Thus after completing a given revolution the first bristle tuft of the next revolution would lie halfway between the first two bristle tufts of the previous helical row of tufts, the tufts not being aligned until the brush had made two revolutions. When the ratio between the speed of rotation of the brush arbor and that of the contact wheel 111 differs slightly from an even number, the resulting brush is a "spiral brush."

To permit the brush-forming apparatus to form brushes having spirally disposed rows of tufts thereon, here called "spiral brushes," with the desired spacing between tufts, such as the brush 10' shown in FIG. 2, there is provided the following additional gear mechanism, which is shown in FIGS. 4–10, inclusive. As will be seen, the apparatus is provided with means whereby the drive train between the shaft 75 of the spacing mechanism and contact wheel 111 may be readily changed from that above described to that now to be described.

The additional gearing, for forming spiral brushes, includes a gear set wherein two gears 162, 164 are fixedly connected together and are connected to shaft 80 so as to rotate therewith. One of such gears, here shown at 164, has a diameter which is somewhat larger than that of the other gear. Such further gearing includes means whereby a driving connection may be selectively established between either of gears 162 and 164 and the third gear 165 on shaft 86 or, in forming straight row brushes as above described, gear 165 is driven by neither of gears 162 and 164.

A first intermediate gear 166 of such further gearing device is shown in FIG. 5 as being mounted upon a stub shaft 169 on a plate 171, disposed between and somewhat above gears 162 and 165, and constantly in mesh with gear 162. A similar intermediate gear 167 is disposed between gears 164 and 165 and somewhat therebelow, such gear being mounted upon a stub shaft 170, likewise secured to plate 171, and in constant mesh with gear 164. The plate 171 is pivotally secured to the frame portion 81 coaxial of shaft 80 so that it may selectively be swung downwardly (FIG. 9), to cause intermediate gear 166 to mesh with the gear 165, or upwardly (FIG. 10), to cause intermediate gear 167 to mesh with gear 165. The plate 171 may conveniently be swung into either of such positions or into the neutral position thereof shown in FIG. 5 wherein neither of gears 166 and 167 meshes with gear 165, and retained in any of such three positions by tightening a machine screw 174 which is threaded into the frame 77 and extends through an arcuate slot 175 in the plate 171.

When the plate 171 is swung into either its upper or lower position and the drive proceeds from either gear 164 or gear 162, respectively, to the gear 165, the differential driving mechanism 87 now comes into play. Such driving mechanism 87 modifies by a small predetermined amount the speed at which gear 89 is driven by means of gear 82, through intermediate gear 84 and gear 85. The drive then proceeds, as before, from gear 89 through the serially arranged intermediate gears and pinion sets to the contact wheel 111.

Differential gearing mechanism 87, to be described, by the proper choice of the gear ratios therein permits the ratio of the speed of rotation of the contact wheel 111 to be changed in a small predetermined amount which is not attainable by commercially available fixed gearing such as that employed in the first described gear train herein which is used for the making of straight brushes.

The construction of the differential gearing mechanism 87 and its manner of operation will be more fully understood by consideration of FIGS. 6, 7, and 8. As there shown, a worm gear 176 is mounted upon shaft 86 and is fixed thereto through the hub 177 of such gear. Meshing with the worm gear 176 is a worm 179 which is disposed between the primary gears 85 and 89 offset from the shaft 86 and fixed to a shaft 180 which is journalled in pedestals 181 affixed to and projecting from the side of gear 89. Thus the worm 179 rotates with gear 89 about shaft 86. Fixed to shaft 180 is a first mitre gear 182 which meshes with a second mitre gear 184 affixed to a stub shaft 185 which extends through and is journalled in the gear 89 parallel to the axis of shaft 86. Mounted upon the end of shaft 185 between the primary gears 89 and 85 and affixed against rotation with respect to shaft 185 is a first spur gear 186. A second spur gear 187, which is fixedly connected to gear 85 and thus rotates therewith with shaft 86, meshes with and drives spur gear 186. The worm 179 and its meshing worm gear 176 have such pitch that the drive between them is irreversible, that is, the worm 179, when driven about its axis, will rotate the worm gear 176, but the worm gear 176 cannot drive the worm 179 for rotation about the axis of such worm.

As a result of such construction, when the drive to the differential gearing mechanism 87 is derived solely from gear 82 through gear 84 to the primary gear 85, the shaft 86 and the worm gear 176 are driven at the same angular speed as gear 85, the worm gear 176 driving the third primary gear 89 through the now locked worm 179, the stub shaft 185, and the journal in gear 89 through which such shaft extends. Such manner of drive of the apparatus, which is employed when straight row brushes are being formed, thus drives the contact wheel 111 at a predetermined definite speed ratio with respect to the brush core rotating element 42 which is determined by the choice of components of the gear train shown in FIGS. 4 and 5. When, however, spiral row brushes are to be formed by the machine, the plate 171 is swung by handle 172 into either its upper (FIG. 10) or lower (FIG. 9) terminal positions so that the drive to the contact wheel 111 now includes the differential gear mechanism 87, the drive now proceeding both from the gear 82, through gear 84, to the first primary gear 85, and from the second primary gear 165 to the third primary gear 89. As above noted, the use of the two gears 162 and 164 of somewhat different diameter permits spiral row brushes having two different configurations of row angle and row spacing conveniently to be made. It is to be understood, however, that the brush-forming machine in accordance with the invention may include only one of gears 162 and 164 and its respective intermediate gear, if desired.

Assuming that the plate 171 has been shifted into its lower terminal position (FIG. 9), primary gear 165 is now driven by shaft 80 through gear 162 and the intermediate gear 166. The first primary gear 85 remains driven by gear 82 and intermediate gear 84. The spur gear 187, which is affixed to gear 165, then rotates the spur gear 186 and, through the shaft 185 and the mitre gears 182 and 184, the worm 179. Thus the speed of driving of the third primary gear 89 by the first primary gear 85 is modified by the differential gear mechanism 87.

Depending upon the direction of pitch of the worm 179 and the worm gear 176, the angular speed of the third primary gear 89 may either slightly exceed the angular speed of gear 85 or may be slightly less than the speed of gear 85. As a result, corresponding notches in the strand 17 and thus the bristle tufts contained therein in successive helical turns of the strand are displaced angularly from each other in a small predetermined amount. The resulting brush is accordingly one in which the bristle tufts are arranged in spiral or helical rows, as shown in connection with the brush 10.

It is of advantage, particularly when a variety of either straight or spiral brushes are to be produced on the same machine, to make it possible quickly to alter the speed ratio between the shaft 42 and the contact wheel 111. This is done by appropriate substitution of pinion sets 91, 98, and so forth, and the adjustment of the intermediate gears 90, 96, and so forth. In the forming of spiral brushes, the use of the two gears 162 and 164 of different diameters and the provision of means whereby the gear 165 may be selectively driven by either of such gears 162 and 164 makes the machine flexible in operation. Still further variations in the ratio of the speed of rotation of shaft 42 to that of contact wheel 111, when the machine is employed in forming spiral brushes, may be readily obtained by the substitution of sets of spur gears having different driving ratios for the spur gears 86.

In order readily to permit such change of spur gears, the forward frame portion 81 may be conveniently mounted upon frame 77 by a hinge 189, frame portion 81 thus being able to be swung clockwise (FIG. 4) upon the removal of the machine screws 190 which secure it to frame 77. The outboard bearings 191 and 192 for the shafts 83 and 86, respectively, mounted in frame portion 81 are short and of such construction as to permit the forward ends of the shafts to be disengaged from such bearings upon the swinging of the frame portion 81 to its open position. In such open position the gear 165 is exposed. Preferably, means such as keys 194 and 195 are employed to maintain the gears 165 and 187 from relative rotation and the gear 186 from rotation with respect to its shaft 185, respectively. Thus such gears may be readily slid from their shafts and replaced by other gears providing desired different speed ratios.

The following description of a brush-forming machine in accordance with the invention is intended as a non-limiting example. The worm gear 176 is one that is commercially available, designated 12 double pitch, 40 teeth, 3.33″ pitch diameter. The worm 179 is one designated 12 double pitch 1⅝″ face diameter. The miter gears of gear set 79 and the miter gears 182 and 184, for simplicity, are shown as having equal diameters in each set, although it is obvious that the speeds of driving through the miter gear sets may be suitably changed if desired. Primary gears 85 and 89, for simplicity, are shown as being of the same diameter and each having 100 teeth. Primary gear 165 has a diameter slightly smaller than that of gears 85 and 89 and has 99 teeth. When the specifically described brush-forming machine is employed in the forming of spiral brushes, and with an assumed pitch and direction of drive of worm 179, it will be seen that with an assumed speed of 100 r.p.m. of gear 85 the worm gear 176 is driven at the same speed. Gear 165, however, under the assumed conditions will revolve at 99 r.p.m., thus losing 1 revolution in 100. Spur gears 186 and 187, which are assumed to have the same diameter, thus rotate shaft 185 and the worm 179 at 99 r.p.m. with an assumed ratio of 20:1 between worm 179 and worm wheel 176, the third primary gear 89 will make $\frac{1}{20}$ of a revolution less than the first primary gear 85, or 99$\frac{19}{20}$ revolutions per 100 revolutions of gear 85. As a result, in a spiral brush having a length of 25″ and 100 turns of notched strand 17 thereon, the notches in the strand and thus the bristle tufts will have a spiral over such 25″ length equal to $\frac{1}{20}$ of a revolution about the brush.

If for the gear 165 there is substituted one of somewhat less diameter and having, for example, 98 teeth, a spiral brush will be obtained having a helix angle twice that of the above specific example. Fractional changes in the pitch of the spiral rows of the brush may readily be obtained by substitution of different combinations of spur gears 186, 187 having different desired driving ratios but equal center distances.

The brush-forming machine of the invention is particularly characterized by the accuracy of bristle row formation of brushes formed thereon. The machine may readily be set up in advance, without trial, to produce new brushes having thereon desired bristle row configurations and spacings. The machine can readily be shifted from the formation of straight row brushes to spiral row brushes and vice versa, in each case the machine producing accurate brushes of the desired configuration. Spacing between successive notches in the strand 17 may be accurately determined and maintained. Thus the contact wheel 111 imposes only a small load upon the spacing mechanism and can not alter the accuracy of the spacing mechanism, which employs a gear drive throughout. The solenoid operated punch, having its own separate source of power, is merely triggered by the contact wheel and the switch operated thereby. Consequently, the timing of the operative punching strokes of the press is very accurate.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus instead of the illustrated change speed gears 90, 96, etc., there may be employed a quick change gear box which will enable the operator quickly to change the speed ratio between gear 89 and the contact operating wheel 111. Also, although an electrically operated punch for notching the strip 17 is preferred, the punch or cutting tool for that purpose may, if desired, be mechanically driven and controlled and timed by mechanism in accordance with the invention.

What is claimed is:

1. A machine for making brushes, comprising a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, driven means on the support positioned along the path of feeding of the strand to the core progressively to notch said side edge of the strand at spaced locations therealong, means interconnecting and positively synchronizing the brush core rotating element and the strand notching means, and means to feed bristles to the notched edge of the strand as it is fed onto the core.

2. A machine for making brushes as claimed in claim 1, wherein the means interconnecting and positively synchronizing the brush core rotating element and the strand notching means comprises a plurality of serially connected gears.

3. A machine for making brushes, comprising a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, driven means on the support positioned along the path of feeding of the strand to the core progressively to notch said side edge of the strand at spaced locations therealong, means interconnecting and positively synchronizing the brush core rotating element and the strand notching means, and means to feed bristles to the notched edge of the strand as it is fed onto the core, the means interconnecting and positively synchronizing the brush core rotating element and the strand notching means comprising a source of power for intermittently driving the strand notching means, timing means for controlling the successive applications of power from said power source to the strand notching means to drive the notching means in a strand notching operation, and a driving train extending from the brush core rotating element to the timing means, said driving train comprising a plurality of serially connected gears and positively synchronizing the speed and instantaneous position of the timing means with those of the brush core rotating element.

4. A machine for making brushes as claimed in claim 3, wherein the strand notching means has an electrically driven motor, the source of power is a source of electric current, and the timing means for controlling the successive applications of power to the strand notching means comprises a circuit opening and closing switch interposed between the source of electric current and the electric motor, said switch being connected to and driven by the said driving train.

5. A machine for making brushes as claimed in claim 4, wherein the strand notching means is a reciprocating press, the electrically driven motor therefor is a solenoid, and the switch is connected to energize the solenoid to power the press at each strand notching operation.

6. A machine for making straight row brushes as claimed in claim 3, wherein the positive synchronous driving train consists of a plurality of rotating gears and shafts connected in series.

7. A machine for making spiral row brushes, comprising a brush core rotating element, means for driving said elements, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, driven means on the support positioned along the path of feeding of the strand to the core progressively to notch said side edge of the strand at spaced locations therealong, means interconnecting and positively synchronizing the brush core rotating element and the strand notching means, and means to feed bristles to the notched edge of the strand as it is fed onto the core, the interconnecting means being so constructed and arranged that corresponding notches in successive helical turns of the strand on the brush core lie angularly displaced about the core by a small part of the angle between successive notches on the same turn of the strand.

8. A machine for making spiral row brushes as claimed in claim 7, wherein the means interconnecting and positively synchronizing the brush core rotating element and the strand notching means comprises a gear train consisting of a plurality of serially connected gears and shafts and includes a differential gear mechanism.

9. A machine for making spiral row brushes as claimed in claim 8, wherein said differential gear mechanism is a unit forming one of the serially connected elements of the gear train, said differential gear mechanism having two primary gears connected in series in the gear train, and means positively drivingly interconnecting the primary gears whereby they rotate together but at slightly different speeds.

10. A machine for making spiral row brushes as claimed in claim 9, comprising a shaft, wherein said two primary gears are disposed coaxially on said shaft, a first one of said primary gears is fixed to the shaft and the second one of said primary gears is rotatable with respect to the shaft, and wherein the means positively drivingly interconnecting the primary gears comprises a worm journalled upon the second of said primary gears for rotation therewith, a worm gear meshing with the worm and fixed to said shaft, means driven by the shaft for driving the worm for rotation about its axis and drivingly connecting the worm to the second primary gear, whereby the first primary gear drives the second primary gear at a speed which is slightly different from that of the first primary gear.

11. A machine for making spiral row brushes as claimed in claim 10, wherein the worm is journalled upon the second primary gear transversely to and offset from the axis of the shaft, and the means for driving the worm and drivingly connecting the worm to the second primary gear comprises a second shaft drivingly connected to the worm and the second primary gear, a first pinion fixed to the first primary gear and driven thereby, and a second pinion meshing with the first pinion and fixed to the second shaft to rotate therewith.

12. A machine for making spiral row brushes as claimed in claim 11, wherein the second shaft is disposed parallel to the first shaft, is offset radially therefrom, and extends through and is thus drivingly connected to the second primary gear, and wherein the first pinion is disposed on the first shaft coaxially of the first primary gear, and comprising means readily releasably affixing the first primary gear and the first pinion, and the second pinion, to the first and second shafts, respectively.

13. A machine for making brushes, comprising a brush core rotating element, means for driving said element, a support mounted closely adjacent the brush core, the brush core and support being mounted for movement relative to each other along a path parallel to the axis of the core, means mounted on the support for feeding a strand having a side edge toward the core, for guiding the strand, for positioning it for winding in a helix on the core by rotation of the core, and for compacting the helix on the core, driven means on the support positioned along the path of feeding of the strand to the core progressively to notch said side edge of the strand at spaced locations therealong, means to feed bristles to the notched edge of the strand as it is fed onto the core, and means selectively interconnecting and positively synchronizing the brush core rotating element and the strand notching means for forming straight row brushes and for forming spiral row brushes.

14. A machine for making brushes as claimed in claim 13, wherein the means selectively interconnecting and positively synchronizing the brush core rotating element and the strand notching means comprises a gear train directly interposed between and connected to the brush core rotating element and the strand notching means for forming straight row brushes, a gear means connected in series with at least a part of the gear train, and means selectively to disconnect the gear train from and to connect the said series connected gear means and said part of the gear train between the brush core rotating element and the strand notching means for forming spiral row brushes.

15. A machine for making brushes as claimed in claim 13, wherein the means interconnecting and positively synchronizing the brush core rotating element and the strand notching means comprises a gear train composed of a plurality of serially connected gears and includes a gear mechanism disposed in said train and having first and second selectively driven primary power input gears and a third, power output primary gear, and means selectively drivingly connecting the first and third primary gears for rotating together at equal angular speeds, whereby to form straight row brushes when the first primary gear is driven and the second primary gear is undriven, and for drivingly connecting the second and third primary gears for rotation at slightly different angular speeds, whereby to form spiral row brushes, when both the first and second primary gears are driven, and means for selectively connecting the first primary gear only to the portion of the drive train from the brush core rotating element and for connecting both the first and second primary gears to said portion of the drive train.

16. A machine for making brushes as claimed in claim 14, wherein the means for selectively drivingly connecting the first and third primary gears and the second and third primary gears comprises a differential gear mechanism drivingly connected to the first, second, and third primary gears, said differential gear mechanism being irreversible and functioning as a direct connection to drive the third primary gear at the same angular speed as the first primary gear when only the first primary gear is driven by said potion of the drive train, and functioning to drive the third primary gear at an angular speed which is slightly different from that of the second primary gear when both the first and second primary gears are driven by said portion of the drive train.

17. A machine for making brushes as claimed in claim 16, comprising a shaft, a first terminal gear of said portion of the drive train fixed to said shaft and permanently drivingly connected to the first primary gear of said gear mechanism, a second terminal gear fixed to said shaft, an intermediate gear disposed between the second terminal gear and the second primary gear of said gear mechanism, and means for selectively shifting said intermediate gear from a position wherein it meshes with said second terminal gear and the second primary gear to a position in which it is disengaged from at least one of such gears.

18. A machine for making brushes as claimed in claim 16, comprising a shaft, a first terminal gear of said portion of the drive train fixed to said shaft and permanently drivingly connected to the first primary gear of said gear mechanism, second and third terminal gears having different diameters fixed to said shaft, intermediate gears disposed between the respective second and third terminal gears and the second primary gear of said gear mechanism, and means for selectively shifting said intermediate gears from different positions, wherein they mesh with said second terminal gear and the respective second and third primary gears to a position in which both said intermediate gears are disengaged from at least one of the second primary gears and the first primary gear.

References Cited by the Examiner

UNITED STATES PATENTS

| | | | |
|---|---|---|---|
| 2,797,966 | 7/1957 | Enchelmaier et al. | 300—2 |
| 3,101,478 | 8/1962 | Oussani | 227—76 |

GRANVILLE Y. CUSTER, Jr., *Primary Examiner.*